United States Patent [19]

Naef

[11] Patent Number: 5,091,517

[45] Date of Patent: Feb. 25, 1992

[54] AZO DYES CONTAINING A 4-AMINOPYRAZOLISOTHIAZOLE DIAZO COMPOUND

[75] Inventor: Rudolf Naef, Lupsingen, Switzerland

[73] Assignee: Ciba-Geigy Corporation, Ardsley, N.Y.

[21] Appl. No.: 610,717

[22] Filed: Nov. 6, 1990

Related U.S. Application Data

[63] Continuation of Ser. No. 325,849, Mar. 20, 1989, abandoned.

[30] Foreign Application Priority Data

Mar. 29, 1988 [CH] Switzerland .................... 1185/88

[51] Int. Cl.$^5$ .................... C09B 29/039; D06P 1/18
[52] U.S. Cl. .................... 534/752; 534/728; 548/212
[58] Field of Search .................... 534/752

[56] References Cited

U.S. PATENT DOCUMENTS 4,524,124 6/1985 Bergthaller et al. ............... 430/241

FOREIGN PATENT DOCUMENTS 2354686 5/1975 Fed. Rep. of Germany .
2429195 2/1976 Fed. Rep. of Germany ...... 534/752
59-152957 8/1984 Japan .................... 534/752

OTHER PUBLICATIONS

Alam et al., *Chemical Abstracts*, vol. 90, No. 123048n (1979.)
Anon., *Chemical Abstracts*, vol. 85, No. 54562h (1976).
Eilingsfeld et al., *Chemical Abstracts*, vol. 84, No. 135649y (1976).
Gakhar et al., *Chemical Abstracts*, vol. 83, No. 58709t (1975).
Irikura et al., *Chemical Abstracts*, vol. 82, No. 125401f (1975).
Miroshnichenko et al., *Chemical Abstracts*, vol. 64, No. 2206h (1966).
Moskalenko et al., *Chemical Abstracts*, vol. 68, No. 14063p (1968).
Vicentini et al., *Chemical Abstracts*, vol. 106, No. 172787k (1987).

*Primary Examiner*—Mary C. Lee
*Assistant Examiner*—Fiona T. Powers
*Attorney, Agent, or Firm*—George R. Dohmann; Edward McC. Roberts

[57] ABSTRACT

The invention relates to novel azo dyes of the formula

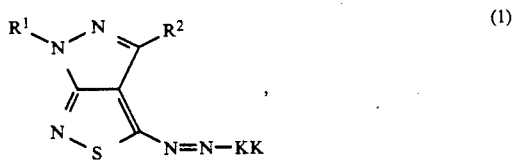

wherein
  $R^1$ is an alkyl radical containing 1 to 12 carbon atoms, which is unsubstituted or substituted by hydroxy, alkoxy, cyano or phenyl, or is an aryl radical selected from the group consisting of phenyl, 1-naphthyl, 2-naphthyl, 2-pyridyl, 4-pyridyl, 2-pyrimidinyl and 2-thienyl, these radicals being unsubstituted or substituted by halogen, $C_1$–$C_6$alkyl, $C_1$–$C_4$alkoxy, nitro, cyano, —$NHR^3$, —NH—C$_2$–$C_6$alkanoyl, —NH—benzoyl, phenoxy, COOR$^3$, —CONHR$^3$, phenyl, sulfo or $C_1$–$C_4$alkylsulfone,
  $R^2$ is hydrogen or a radical as defined for $R^1$,
  $R^3$ is hydrogen, $C_1$–$C_6$alkyl, which is unsubstituted or substituted by hydroxy, alkoxy, cyano or phenyl, or phenyl which is unsubstituted or substituted by halogen, $C_1$–$C_6$alkyl, $C_1$–$C_4$alkoxy, nitro, cyano, —NH—$C_2$–$C_6$alkanoyl, —NH—benzoyl, phenoxy, phenyl, sulfo or $C_1$–$C_4$alkylsulfone, and
  KK is the radical of a coupling component selected from the group consisting of N-arylacetamides, phenols, pyridones, quinolines, pyrazoles, indoles, diphenylamines, anilines, aminopyridines, pyrimidines, pyrimidones, naphthols, naphthylamines, aminothiazoles, thiophenes and hydroxypyrimidines.

Those dyes of formula (1) which do not have a water-solubilizing group are particularly suitable for the dyeing and printing of textile material made of polyester fibers. Those dyes which contain at least one sulfo group are particularly suitable for the dyeing and printing of textile material made of polyamide fibers.

11 Claims, No Drawings

AZO DYES CONTAINING A 4-AMINOPYRAZOLISOTHIAZOLE DIAZO COMPOUND

This application is a continuation of application Ser. No. 325,849, filed Mar. 20, 1989, now abandoned.

The present invention relates to azo dyes which are derived from 4-aminopyrazoloisothiazoles as the diazo component, to the preparation of these azo dyes and their use as dyes for textile material.

The dyes according to the invention conform to the formula

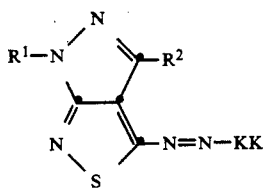

in which
$R^1$ is a substituted or unsubstituted alkyl or aryl radical,
$R^2$ is hydrogen or a substituted or unsubstituted alkyl or aryl radical and
KK is the radical of a coupling component.

According to the invention, alkyl radicals are understood to mean in general straight-chain or branched or cyclic alkyl groups. Examples are methyl, ethyl, propyl, i-propyl, butyl, i-butyl, tert-butyl, amyl, tert-amyl (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, decyl, dodecyl, cyclopentyl, cyclohexyl, methylcyclohexyl and the corresponding isomers. The alkyl radicals preferably contain 1 to 12 C atoms, in particular 1 to 6 C atoms.

These alkyl radicals can be substituted, for example by hydroxyl, alkoxy, cyano or phenyl. Examples of these substituted alkyl radicals are hydroxyethyl, methoxymethyl, ethoxyethyl, cyanoethyl, propoxypropyl or benzyl.

An aryl radical $R^1$ and/or $R^2$ can be carbocyclic or heterocyclic. This radical, as is generally the case with aryl in this application, can be, for example, a phenyl, 1-naphthyl, 2-naphthyl, 2-pyridyl, 3-pyridyl, 4-pyridyl, 2-pyrimidyl or 2-thienyl radical. These radicals can be substituted, for example by halogen, such as fluorine, bromine, iodine or in particular chlorine, $C_1$–$C_6$alkyl, $C_1$–$C_4$alkoxy, nitro, CN, —NH—$R^3$, -NH-acyl, phenoxy, —COOR$^3$, —CONHR$^3$, substituted or unsubstituted phenyl, sulfo or $C_1$–$C_4$alkylsulfone, in which $R^3$ is hydrogen, substituted or unsubstituted $C_1$–$C_6$alkyl or substituted or unsubstituted phenyl.

The radicals $R^1$ and $R^2$ can have 1 to 3 of the above-mentioned substituents.

In an -NH-acyl substituent the acyl radical can be for example a $C_2$–$C_6$alkanoyl or benzoyl radical. Examples of suitable $C_2$–$C_6$alkanoyl radicals are acetyl, propionyl, butyryl, isobutyryl, valeryl, isovaleryl or pivaloyl.

Benzoyl may be further substituted in the manner described above for aryl.

A phenoxy substituent can be unsubstituted or be further substituted in the manner described above for phenyl; preferably, phenoxy is in this case not further substituted.

$R^1$ is preferably a $C_1$–$C_6$alkyl radical which is unsubstituted or substituted by $C_1$–$C_4$alkoxy, cyano or phenyl, or is a phenyl radical which is unsubstituted or substituted by chlorine, $C_1$–$C_4$alkyl or $C_1$–$C_4$alkoxy, nitro, $C_1$–$C_4$alkylamino, sulfo, $C_1$–$C_4$alkylsulfone, phenyl or phenoxy.

In particularly useful dyes of the formula (1), $R^1$ is an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy.

Of these radicals, those are particularly preferred in which $R^1$ is an unsubstituted or a chlorine-substituted phenyl radical.

$R^2$ is preferably hydrogen or a $C_1$–$C_6$alkyl radical which is unsubstituted or substituted by $C_1$–$C_4$alkoxy, cyano or phenyl, or is a phenyl radical which is unsubstituted or substituted by chlorine, $C_1$–$C_4$alkyl or $C_1$–$C_4$alkoxy, nitro, $C_1$–$C_4$alkylamino, sulfo, $C_1$–$C_4$alkylsulfone, phenyl or phenoxy.

In particularly useful dyes of the formula (1), $R^2$ is hydrogen, an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy.

Of these radicals, those are particularly preferred in which $R^2$ is hydrogen or an unsubstituted $C_1$–$C_4$alkyl radical.

Suitable coupling components KK are the coupling components customary for azo dyes and known from the standard literature.

Examples selected from the large number of possibilities are: coupling components of the benzene series, the naphthalene series, the open-chain active methylene compounds (for example those of the aryl-acylacetamides) and the heterocyclic series.

Examples of the radicals mentioned of coupling components KK are radicals from the series of N-arylacylacetamides, phenols, pyridones, quinolines, pyrazoles, indoles, diphenylamines, anilines, aminopyridines, pyrimidines, pyrimidones, naphthols, naphthylamines, aminothiazoles, thiophenes or hydroxypyridines.

Particularly suitable radicals KK are those from the series of acetoacetanilides, phenols, anilines, diphenylamines, naphthylamines, naphthols, indoles, quinolines, pyridones, pyrazoles, quinolones and aminopyridines.

These coupling components can carry further substituents which are customary for coupling components in dye chemistry, for example hydroxyl, amino, alkylamino, dialkylamino, halogen, alkoxy, aryl, aryloxy, alkylcarbonylamino, arylcarbonylamino, alkylsulfonylamino or sulfo.

Owing to their particularly good colouristic properties, those dyes of the formula (1) are particularly preferred in which KK is the radical of an aniline, naphthylamine or tetrahydroquinoline, where these radicals can be substituted by $C_1$–$C_4$alkyl, $C_1$–$C_4$alkylcarbonylamino, phenyl, $C_1$–$C_4$alkylphenyl or sulfo.

Particularly preferred azo dyes according to the invention are those of the formula (1)
in which
$R^1$ is an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy, $R^2$ is hydrogen, an unsubstituted $C_1$-$C_4$alkyl radical or a phenyl radical which is unsubstituted or substituted by methyl, ethyl, methoxy, ethoxy, nitro, chlorine, sulfo, acetylamino, phenyl or phenoxy, and KK is the radical of a coupling component from the series of acetoacetanilides, phenols, anilines, diphenylamines, naphthylamines, naphthols, indoles, quinolines, pyridones, pyrazoles, quinolones and aminopyridines, where these radicals are unsubstituted or substituted by hydroxyl, amino, alkylamino, dialkylamino, halogen, alkoxy, aryl, aryloxy, alkylcarbonylamino, arylcarbonylamino, alkyl-sulfonylamino or sulfo.

Of these radicals, those are particularly preferred in which $R^1$ is an unsubstituted or chlorine-substituted phenyl radical, $R^2$ is hydrogen or an unsubstituted $C_1$-$C_4$alkyl radical and KK is the radical of an aniline, naphthylamine or tetrahydroquinoline, where these radicals can be substituted by $C_1$-$C_4$alkyl, $C_1$-$C_4$alkylcarbonylamino, phenyl, $C_1$-$C_4$alkylphenyl or sulfo.

The novel azo dyes of the formula (1) can be prepared by processes known per se. They are obtained, for example, by diazotizing a compound of the formula

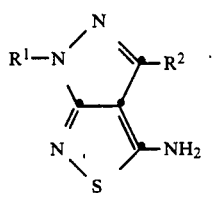

(2)

and coupling the diazotized product onto a coupling component

 (3)

in which $R^1$, $R^2$ and KK are as defined in formula (1).

The compounds of the formula (2) are known or can be prepared by methods known per se, for example by the procedure described in Il. Farmaco, Ed. Sci., 42, 133 (1987). The coupling components H-KK are also known.

The diazotization of the compounds of the formula (2) is carried out in a manner known per se, for example with sodium nitrite in an acidic, for example hydrochloric acid or sulfuric acid, aqueous medium. However, it is also possible to carry out the diazotization with other diazotizing agents, for example with nitrosylsulfuric acid. During the diazotization, an additional acid can be present in the reaction medium, for example phosphoric acid, sulfuric acid, acetic acid, propionic acid, hydrochloric acid or mixtures of these acids, for example mixtures of phosphoric acid and acetic acid. Advantageously, the diazotization is carried out at temperatures from $-10°$ to $30°$ C., for example from $-10°$ C. to room temperature.

The coupling of the diazotized compound of the formula (2) onto the coupling component H-KK is also carried out in a manner known per se, for example in an acidic, aqueous or aqueous/organic medium, advantageously at temperatures from $-10°$ to $30°$ C., in particular below $10°$ C. Examples of the acids used are hydrochloric acid, acetic acid, sulfuric acid or phosphoric acid. Diazotization and coupling can be carried out, for example, in a one-pot process, that is, in the same reaction medium.

Those compounds of the formula (1) according to the invention which do not have any water-solubilizing groups, in particular sulfo groups, can be used as disperse dyes for the dyeing and printing of semi-synthetic and in particular synthetic hydrophobic fibre materials, in particular textile materials. Textile materials made of mixed fabrics which contain such semi-synthetic or synthetic hydrophobic textile materials can also be dyed or printed by means of the compounds according to the invention.

Semi-synthetic textile materials are in particular secondary cellulose acetate and cellulose triacetate.

Synthetic hydrophobic textile materials consist in particular of linear aromatic polyesters, for example those obtained from terephthalic acid and glycols, in particular ethylene glycol or condensation products obtained from terephthalic acid and 1,4-bis(hydroxymethyl)cyclohexane; or those obtained from polycarbonates, for example those obtained from α, α-dimethyl-4,4'-dihydroxdiphenylmethane and phosgene, or consist of fibres based on polyvinyl chloride and polyamides.

The application of the disperse dyes according to the invention to the textile materials is carried out by known dyeing procedures. For example, polyester fibre materials are dyed by the exhaust method from an aqueous dispersion in the presence of customary anionic or non-ionic dispersants and in the absence or presence of customary swelling agents (carriers) at temperatures between $80°$ and $140°$ C. Secondary cellulose acetate is preferably dyed between about $65°$ to $85°$ C. and cellulose triacetate at temperatures of up to $115°$ C.

The novel disperse dyes produce only little staining if any on wool and cotton when present in the dye bath at the same time, i.e. they have very good reserve, so that they are also very suitable for the dyeing of polyester/wool and polyester/cellulose fibre mixed fabrics.

The disperse dyes according to the invention are, however, in particular suitable for the dyeing by the thermosol process.

The textile material mentioned can be present for the dyeing in a large range of processing forms, for example as fibres, threads or nonwovens, as woven fabric or knitted fabric.

It is advantageous to convert the disperse dyes according to the invention into a dye preparation before they are used. This is done by milling the dye, until its particle size is on average between 0.01 and 10 μm. The milling can take place in the presence of dispersing agents. For example, the dried dye is milled together with a dispersing agent or is kneaded in the form of a paste with a dispersing agent and then dried in vacuo or by spraying. The preparations thus obtained can be used, after the addition of water, for dyeing and printing.

For printing, the customary thickeners are usually used, for example modified or unmodified natural products, for example alginates, British gum, gum arabic, crystal gum, carob flour, tragacanth, carboxymethylcellulose, hydroxyethylcellulose, starch or synthetic products, for example polyacrylamides, polyacrylic acid or copolymers thereof or polyvinyl alcohols.

The disperse dyes according to the invention are virtually insensitive to carriers and give the materials mentioned, in particular the polyester material, level blue to violet hues, which have very good wear fastness properties, in particular good light fastness, thermo setting and pleating fastness, chlorine and wetfastness, such as water, perspiration and wash fastness; the dyeings are also distinguished by good pH stability and very good rub fastness. In addition, very strong dyeings are obtained. The good sublimation fastness and the good thermosetting fastness of the dyeings obtained should be emphasized in particular.

The dyes according to the invention are also very suitable for the preparation of mixed shades together with other dyes. It is, of course, also possible to use mixtures of the dyes according to the invention with each other.

Those monoazo dyes of the formula (1) which contain a sulfo group are present either in the form of the free sulfonic acid or preferably as a salt thereof. Examples of suitable salts are the alkali metal, alkaline earth metal or ammonium salts, or the salts of an organic amine. Examples are the sodium salts, lithium salts, potassium salts or ammonium salts or the salt of triethanolamine.

The sulfo-containing azo dyes of the formula (1) can be isolated and processed to give useful dry dye preparations. They are preferably isolated at low temperatures by salting out and filtration. The filtered dyes can be, if desired, dried after the addition of diluents and/or buffer solutions, for example after the addition of a mixture consisting of equal parts of monosodium and disodium phosphate; preferably, the drying is carried out at not too elevated temperatures and under reduced pressure. In certain cases, the dry preparations according to the invention can be prepared directly, that is, without isolation of the intermediate dyes, by spray-drying of the entire preparation mixture.

The sulfo-containing azo dyes of the formula (1) produce dyeings having good wet- and lightfastness properties. It should be mentioned in particular that the dyes have a good solubility and electrolyte solubility in combination with good exhaust properties and high dye fixation and that the unfixed components can be easily removed. Apart from their good water solubility, the azo dyes of the formula (1) are distinguished by high stability of the solution in padding liquors even at different pH values and by very good print paste stability.

The sulfo-containing azo dyes of the formula (1) are suitable for the dyeing and printing of a wide range of materials, but in particular of silk, wool and polyamide fibres. They are suitable not only for the exhaust process but also for dyeing by the pad dyeing process, in which the goods are impregnated with aqueous and, if desired, also salt-containing dye solutions.

They are also suitable for the printing of nitrogen-containing fibres, for example of wool, polymamides or mixed fabrics containing silk or wool.

It is recommended to subject the dyeings and prints to thorough rinsing with cold and hot water, if necessary with the addition of an agent which acts as a dispersing agent and promotes the diffusion of the unfixed components.

In the examples which follow, parts and percentages are by weight. The temperatures are degrees Celsius.

EXAMPLE 1

2.2 g of 4-amino-1-phenylpyrazolo[3,4-c]isothiazole are suspended in a mixture of 40 ml of glacial acetic acid and 10 ml of propionic acid and, after cooling the mixture to 0° C., 5 ml of concentrated sulfuric acid are added. With thorough cooling, 0.7 g of sodium nitrite dissolved in 10 ml of water is added dropwise, in the course of which the suspension gradually dissolves to give a pink solution. The solution is added dropwise to a solution of 2.5 g of 3-diethylaminoacetanilide in 30 ml of glacial acetic acid, 40 ml of ethanol and 50 ml of water, during which the pH is maintained at about 3.5 by constant addition of 2N sodium hydroxide solution. The blackish precipitate is filtered off and recrystallized from dimethylformamide/water, after which 2.6 g (60%) of greenish crystals of melting point 194° C. are isolated. The dye conforms to the formula

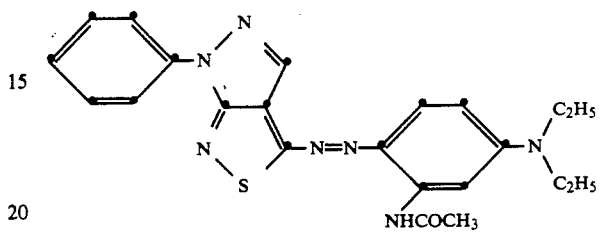

and dyes polyester material in reddish blue hues having very good fastness properties, in particular very good lightfastness and sublimation fastness.

EXAMPLE 2

Analogously to Example 1, 2.2 g of 4-amino-1-phenylpyrazolo[3,4-c]isothiazole are reacted with 1.9 g of 1,2,2,4-tetramethyl-1,2,3,4-tetrahydroquinoline to give, after recrystallization from dimethylformamide/ethanol/water, green shiny crystals of melting point 190° C. The dye conforms to the formula

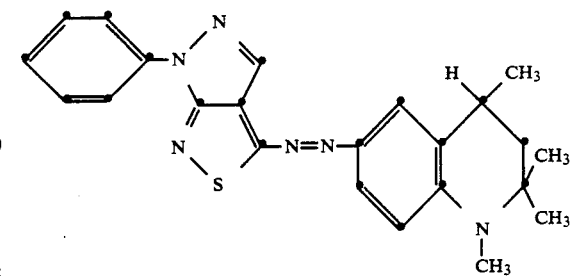

and dyes polyester fibres in blue-violet hues having very good fastness properties.

EXAMPLE 3

Analogously to Example 1, 2.2 g of 4-amino-1-phenylpyrazolo[3,4-c]isothiazole are coupled with 1.72 g of N,N-dimethyl-1-napthylamine. After recrystallization from dimethylformamide/ethanol/water, greenish black crystals of melting point 200° C. are obtained. The dye conforms to the formula

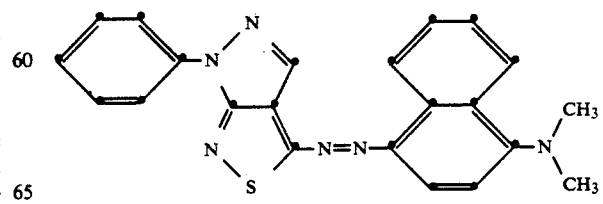

and dyes polyester material in blue hues having good fastness properties.

EXAMPLE 4

Analogously to Example 1, 2.2 g of 4-amino-phenyl-pyrazolo[3,4-c]isothiazole are coupled with 1.6 g of N,N-diethyl-m-toluidine. After recrystallization from dimethylformamide/water, greenish crystals of melting point 195° C. are obtained. The dye conforms to the formula

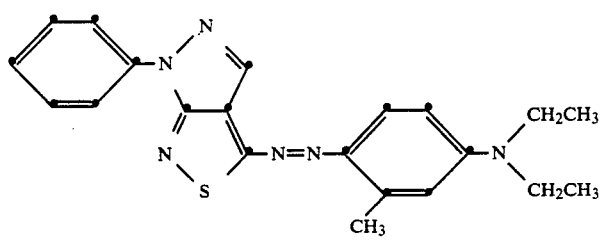

and dyes polyester material in blue-violet hues having good fastness properties.

EXAMPLE 5

Analogously to Example 1, 2.3 g of 4-amino-3-methyl-1-phenylpyrazolo[3,4-c]isothiazole react with 1.65 ml of N,N-dimethyl-1-naphthylamine. Purification on a silica gel column using carbon tetrachloride gives dark blue crystals of melting point 180° C. The dye conforms to the formula

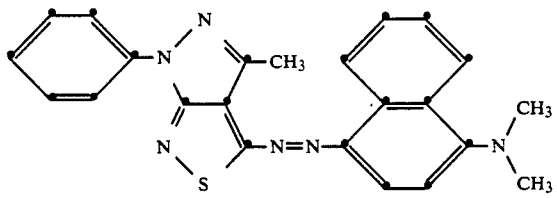

and dyes polyester textile material in bluish violet hues having good fastness properties.

EXAMPLE 6

Analogously to Example 1, 2.3 g of 4-amino-3-methyl-1-phenyl-pyrazolo[3,4-c]isothiazole can be reacted with 1.9 g of 1,2,2,4-tetra-methyl-1,2,3,4-tetrahydroquinoline and, after recrystallization from dimethylformamide/water, dark blue crystals of melting point 210°–211° C. are isolated. The dye conforms to the formula

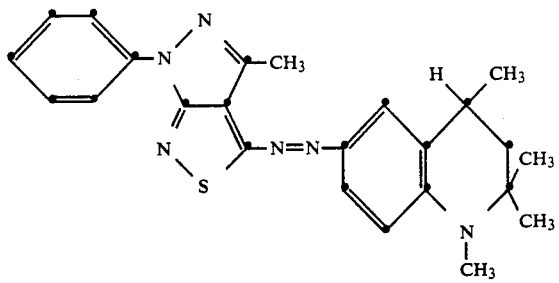

and dyes polyester material in bluish violet hues having good fastness properties.

EXAMPLE 7

Analogously to Example 1, 2.3 g of 4-amino-3-methyl-1-phenyl-pyrazolo[3,4-c]isothiazole are reacted with 1.6 g of N,N-diethyl-m-toluidine and, after purification on a silica gel column using carbon tetrachloride and recrystallization from dimethylformamide/water, dark blue crystals of melting point 165° C. are isolated. The dye conforms to the formula

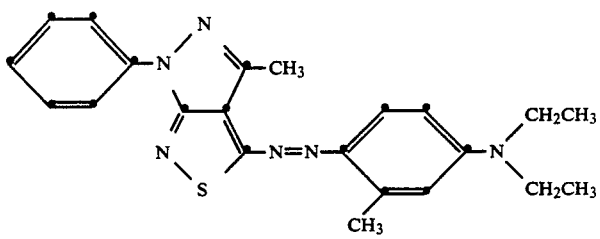

and dyes polyester material in blue hues having good fastness properties.

EXAMPLE 8

Analogously to Example 1, 2.3 g of 4-amino-3-methyl-1-phenyl-pyrazolo[3,4-c]isothiazole are reacted with 2.5 g of 3-diethylaminoacetanilide and, after recrystallizing the product twice from dimethylformamide/water, blackish crystals of melting point 199°–200° C. are isolated. The dye conforms to the formula

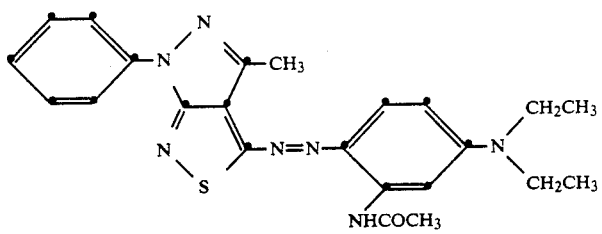

and dyes polyester material in slightly reddish blue hues having good fastness properties.

EXAMPLE 9

2.2 g of 4-amino-1-phenylpyrazolo[3,4-c]isothiazole are suspended in a mixture of 40 ml of glacial acetic acid and 10 ml of propionic acid and, after cooling the mixture to 0° C., 5 ml of concentrated sulfuric acid are added. With thorough cooling, 0.7 g of sodium nitrite dissolved in 10 ml of water is added dropwise, in the course of which the suspension gradually dissolves to give a pink solution. The solution obtained is added dropwise to a solution of 3.1 g of 1-(4-toluidino)naphthalene-8-sulfonic acid, during which the temperature is maintained below 5° C. by the addition of ice and the pH at about 3.5 by constant addition of 2N sodium hydroxide solution. The dark blue greasy precipitate is extracted with chloroform, the organic phase is washed with saturated aqueous sodium chloride solution, dried with sodium sulfate and evaporated, after which a blackish precipitate remains. The dye conforms to the formula lightfastness. The melting point of the dye is above 250° C. (decomposition).

EXAMPLE 10

Analogously to Example 9, 2.3 g of 4-amino-3-methyl-1-phenyl-pyrazolo[3,4-c]isothiazole are reacted with 3.1 g of 1-(4-toluidino)-naphthalene-8-sulfonic acid, after which the crude product is isolated by decanting of the reaction solution and purified on a silica gel column using chloroform. This gives 3.7 g of blue-black crystals, which decompose above 300° C. The dye conforms to the formula

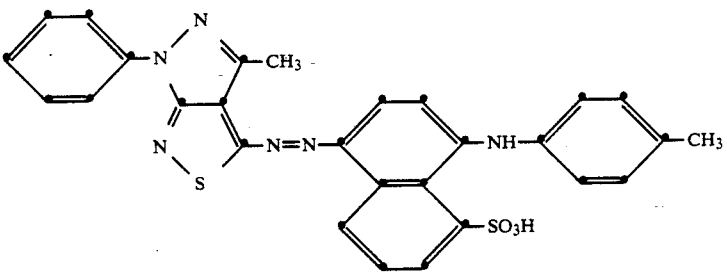

and dyes polyamide material in greenish blue hues having good fastness properties. The dye melts above 300° C. with decomposition.

EXAMPLES 11-15

Analogously to the procedure described in Example 1, the azo dyes listed in the table below are obtained by using the corresponding diazo and coupling components. In column 3 of the table the melting point of the dyes obtained and in column 4 the hue of the dyeings on polyester textile material are shown.

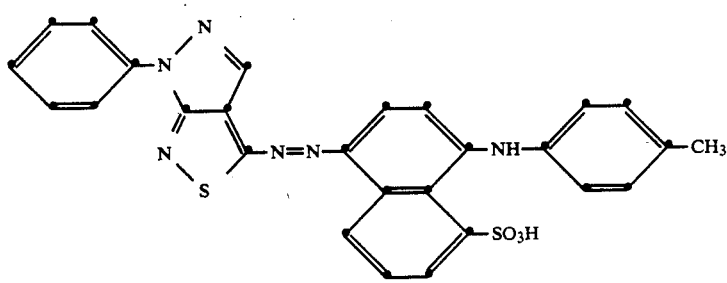

and dyes polyamide textile material in blue hues having very good fastness properties, in particular very good

| Example | Dye | Melting point | Hue |
|---|---|---|---|
| 11 | (structure: 4-chlorophenyl-pyrazolo-isothiazole with CH₃, N=N linked to phenyl-N(CH₃)₂) | 218° C. | violet |
| 12 | (structure: 4-chlorophenyl-pyrazolo-isothiazole with CH₃, N=N linked to phenyl-N(C₂H₅)₂, with HN—COCH₃) | 220° C. | blue |
| 13 | (structure: 4-chlorophenyl-pyrazolo-isothiazole with CH₃, N=N linked to naphthyl-N(CH₃)₂) | 118° C. | blue |
| 14 | (structure: 4-chlorophenyl-pyrazolo-isothiazole with CH₃, N=N linked to methyl-phenyl-N(C₂H₅)₂) | 183° C. | bluish violet |
| 15 | (structure: 4-chlorophenyl-pyrazolo-isothiazole with CH₃, N=N linked to trimethyl-phenyl-N(CH₃) with neopentyl group) | 198° C. | reddish blue |

EXAMPLE 16

The procedure described in Example 9 is repeated, except that instead of the diazo component used there an equivalent amount of 4-amino-3-methyl-1-(3'-chloro)phenylpyrazolo[3,4-c]isothiazole is used. This gives the dye of the formula

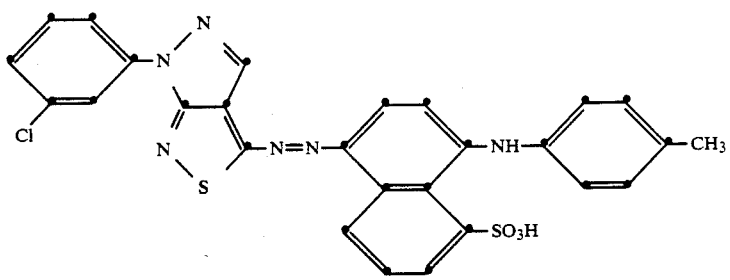

of melting point 186° C. The dye dyes polyester textile material in greenish blue hues having good fastness properties.

EXAMPLE 17

1 part of the dry dye from Example 1, which is free of diluents, is mixed in a sand mill with 2 parts of dinaphthylmethane disulfonate (sodium salt), 34 parts of quartz sand and 17 parts of water, and the mixture is milled until a particle size of about 2μ or less is obtained. The resulting suspension is separated off from the sand and subjected to spray-drying to give a pulverulent dye preparation.

EXAMPLE 18

A polyethylene glycol terephthalate fabric is impregnated on a pad-dyeing machine at 40° with a liquor of the following composition:
20 parts of the dye preparation obtained according to Example 17 finely dispersed in
10 parts of sodium alginate,
20 parts of octylphenol polyglycol ether and
930 parts of water.

The fabric squeezed off to about 60% is dried at 100° and then fixed at a temperature of 210° for 60 seconds. The dyed material is rinsed with water, soaped or reduction cleared and dried. This gives a lightfast reddish blue dyeing, which is distinguished in particular by good sublimation fastness.

EXAMPLE 19

2 parts of the dye preparation obtained according to Example 17 are dispersed in 4000 parts of water, which contains 12 parts of the sodium salt of o-phenylphenol, 2 parts of ammonium sulfate and 2 parts of the sodium salt of dinaphthylmethanedisulfonic acid. 100 parts polyethylene glycol terephthalate yarn are then dyed in this liquor at 95° to 98° for 90 minutes.

The dyeing is then rinsed and subjected to an aftertreatment with aqueous sodium hydroxide solution and a dispersing agent. In this manner, a lightfast and sublimation fast reddish blue dyeing is obtained.

EXAMPLE 20

1 part of the dye obtained according to Example 2 is milled with 2 parts of 50% aqueous solution of the sodium salt of dinaphthylmethanedisulfonic acid while wet and dried.

This dye preparation is stirred with 40 parts of a 10% aqueous solution of the sodium salt of N-benzylheptadecylbenzimidazoledisulfonic acid, and 4 parts of a 40% acetic acid solution are added. Dilution with water gives a dyeing bath containing 4000 parts.

This bath is entered at 50° with 100 parts of a polyester fibre material, the temperature is increased to 120° to 130° within half an hour, and the material is dyed at this temperature in a closed vessel for one hour. It is then thoroughly rinsed. This gives a violet dyeing having good fastness properties, in particular good sublimation fastness and thermomigration fastness.

EXAMPLE 21

10 parts of a Helanca knitted fabric (polyamide) is dyed in 500 parts of an aqueous liquor which contains 2 g/l of ammonium acetate and has been brought to a pH of 5 with acetic acid. The liquor contains 0.7%, relative to the weight of the fibre, of the dye from Example 9. The duration of the dyeing at a temperature of 98° is 30 to 90 minutes. The dye Helanca piece is then removed from the liquor and washed and dried as usual.

This gives a blue-coloured Helanca piece which has a pure shade and good general fastness properties.

EXAMPLE 22

10 parts of a Helanca knitted fabric (polyamide) is dyed in 500 parts of an aqueous liquor which contains 1 g/l of monosodium phosphate and has been brought to a pH of 6 with disodium phosphate. The liquor contains 1% of the dye from Example 9, relative to the weight of the fibre. The duration of the dyeing at a temperature of 98° is 30 to 90 minutes. The dyed Helanca piece is then removed from the liquor and washed and dried as usual.

This gives a blue-coloured Helanca piece which has a pure shade and good overall fastness properties.

EXAMPLE 23

10 parts of a wool piece were dyed in 500 parts of an aqueous liquor which contained, relative to the weight of the fibre, 0.45% of the dye from Example 10, 5% of anhydrous sodium sulfate and 4% of 96% strength sulfuric acid. The duration of the dyeing at a temperature of 98° is 30–60 minutes. The wool piece is washed and dried as usual to give a blue dyeing having very good general fastness properties.

What is claimed is:

1. An azo dye of the formula

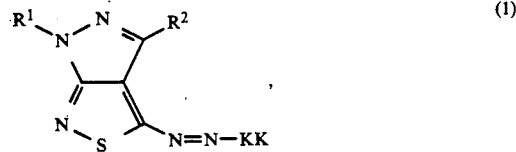

wherein
$R^1$ is an alkyl radical containing 1 to 12 carbon atoms, which is unsubstituted or substituted by hydroxy, alkoxy, cyano or phenyl, or is an aryl radical selected from the group consisting of phenyl, 1- naphthyl, 2-naphthyl, 2-pyridyl, 3-pyridyl, 4-pyridyl, 2-pyrimidinyl and 2-thienyl, these radicals being unsubstituted or substituted by halogen, $C_1$–$C_6$alkyl, $C_1$–$C_4$alkoxy, nitro, cyano, —$NHR^3$, -NH-$C_2$–$C_6$alkanoyl, -NH-benzoyl, phenoxy, $COOR^3$, —$CONHR^3$, phenyl, sulfo or $C_1$–$C_4$alkylsulfone, $R^2$ is hydrogen or a radical as defined for $R^1$, $R^3$ is hydrogen, $C_1$–$C_6$alkyl, which is unsubstituted or substitued by hydroxy, alkoxy, cyano or phenyl, or phenyl which is unsubstituted or substituted by halogen, $C_1$–$C_6$alkyl, $C_1$–$C_4$alkoxy, nitro, cyano, -NH-$C_2$–$C_6$alkanoyl, -NH-benzoyl, phenoxy, phenyl, sulfo or $C_1$–$C_4$alkylsulfone, and KK is the radical of a coupling component selected from the group consisting of N-arylacetamides, phenols, pyridones, quinolines, pyrazoles, indoles, diphenylamines, anilines, aminopyridines, pyrimidines, pyrimidones, naphthols, naphthylamines, aminothiazoles, thiophenes and hydroxypyrimidines.

2. An azo dye according to claim 1 in which $R^1$ is a $C_1$–$C_6$alkyl radical which is unsubstituted or substituted by $C_1$–$C_4$alkoxy, cyano or phenyl, or is a phenyl radical which is unsubstituted or substituted by chlorine, $C_1$–$C_4$alkyl or $C_1$–$C_4$alkoxy, nitro, $C_1$–$C_4$alkylamino, sulfo, $C_1$–$C_4$alkylsulfone, phenyl or phenoxy.

3. An azo dye according to claim 2 in which $R^1$ is an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy.

4. An azo dye according to claim 1 in which $R^1$ is an unsubstituted or chlorine-substituted phenyl radical.

5. An azo dye according to claim 1 in which $R^2$ is hydrogen or a $C_1$–$C_6$alkyl radical which is unsubstituted or substituted by $C_1$–$C_4$alkoxy, cyano or phenyl, or is a phenyl radical which is unsubstituted or substituted by chlorine, $C_1$–$C_4$alkyl or $C_1$–$C_4$alkoxy, nitro, $C_1$–$C_4$alkyl-amino, sulfo, $C_1$–$C_4$alkylsulfone, phenyl or phenoxy.

6. An azo dye according to claim 5 in which $R^2$ is hydrogen or an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy.

7. An azo dye according to claim 6 in which $R^2$ is hydrogen or an unsubstituted $C_1$–$C_4$alkyl radical.

8. An azo dye according to claim 1 in which KK is the radical of a coupling component selected from the group consisting acetoacetanilides, phenols, anilines, diphenylamines, naphthylamines, naphthols, indoles, quinolines, pyridones, pyrazoles, quinolones and aminopyridines, where these radicals are unsubstituted or substituted by hydroxyl, amino, alkylamino, dialkylamino, halogen, alkoxy, aryl, aryloxy, alkylcarbonylamino, arylcarbonylamino, alkylsulfonylamino or sulfo.

9. An azo dye according to claim 8 in which KK is the radical selected from the group consisting of aniline, naphthylamine or tetrahydroquinoline, where these radicals can be substituted by $C_1$–$C_4$alkyl, $C_1$–$C_4$alkylcarbonylamino, phenyl, $C_1$–$C_4$alkylphenyl or sulfo.

10. An azo dye according to claim 1 in which $R^1$ is an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy, $R^2$ is hydrogen, an unsubstituted $C_1$–$C_4$alkyl radical or a phenyl radical which is unsubstituted or substituted by methyl, ethyl, methoxy, ethoxy, nitro, chlorine, sulfo, acetylamino, phenyl or phenoxy, and KK is the radical of a coupling component from the series of acetoacetanilides, phenols, anilines, diphenylamines, naphthylamines, naphthols, indoles, quinolines, pyridones, pyrazoles, quinolones and aminopyridines, where these radicals are unsubstituted or substituted by hydroxyl, amino, alkylamino, dialkylamino, halogen, alkoxy, aryl, aryloxy, alkylcarbonylamino, arylcarbonylamino, alkyl-sulfonylamino or sulfo.

11. An azo dye according to claim 1 in which $R^1$ is an unsubstituted or chlorine-substituted phenyl radical, $R^2$ is hydrogen or an unsubstituted $C_1$–$C_4$alkyl radical and KK is the radical of an aniline, naphthylamine or tetrahydroquinoline, where these radicals can be substituted by $C_1$–$C_4$alkyl, $C_1$–$C_4$alkylcarbonylamino, phenyl, $C_1$–$C_4$alkylphenyl or sulfo.

* * * * *